(12) United States Patent
Yamaguchi et al.

(10) Patent No.: US 8,600,626 B2
(45) Date of Patent: Dec. 3, 2013

(54) HEADREST APPARATUS, METHOD OF ADJUSTING HEADREST POSITION, VEHICLE SEAT

(75) Inventors: Hiroyoshi Yamaguchi, Yokohama (JP); Makoto Hasegawa, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 78 days.

(21) Appl. No.: 13/164,513

(22) Filed: Jun. 20, 2011

(65) Prior Publication Data

US 2011/0316318 A1 Dec. 29, 2011

(30) Foreign Application Priority Data

Jun. 24, 2010 (JP) ................................. 2010-143753

(51) Int. Cl.
*B60R 22/00* (2006.01)
*B60R 21/00* (2006.01)
*B60N 2/42* (2006.01)
*B60N 2/00* (2006.01)
*G06F 17/00* (2006.01)

(52) U.S. Cl.
USPC ..................... 701/49; 297/216.12; 297/216.1; 297/354.1; 701/45

(58) Field of Classification Search
USPC .......................................................... 701/49
See application file for complete search history.

(56) References Cited

U.S. PATENT DOCUMENTS

| 4,285,545 | A | * | 8/1981 | Protze ........................... 297/483 |
| 4,797,824 | A | * | 1/1989 | Sugiyama et al. .............. 701/49 |
| 6,088,640 | A | * | 7/2000 | Breed ............................. 701/45 |
| 6,746,078 | B2 | * | 6/2004 | Breed ...................... 297/216.12 |
| 2007/0257528 | A1 | * | 11/2007 | Akaike et al. ............ 297/216.12 |
| 2011/0233974 | A1 | * | 9/2011 | Yamaguchi et al. ..... 297/216.12 |
| 2012/0032487 | A1 | * | 2/2012 | Yamaguchi et al. ....... 297/354.1 |

FOREIGN PATENT DOCUMENTS

JP 2009154551 7/2009

* cited by examiner

*Primary Examiner* — Thomas Black
*Assistant Examiner* — Tyler Paige
(74) *Attorney, Agent, or Firm* — Knobbe Martens Olson & Bear LLP

(57) ABSTRACT

There is provided a headrest apparatus including: a headrest main body provided at a top edge portion of a seatback; a detection section to detect contact between the head of an occupant seated in the seat and the headrest main body; a moving section that moves the headrest main body in the vehicle front-rear direction; and a controller that controls the moving section such that the headrest main body is moved forward until contact between the head of an occupant and the headrest main body is detected by the detection section, and, when contact between the head of an occupant and the headrest main body has been detected by the detection section, controls the moving section to move the headrest main body such that there is a specific amount of back-set separation distance in a horizontal direction between the head of an occupant and the headrest main body.

16 Claims, 12 Drawing Sheets

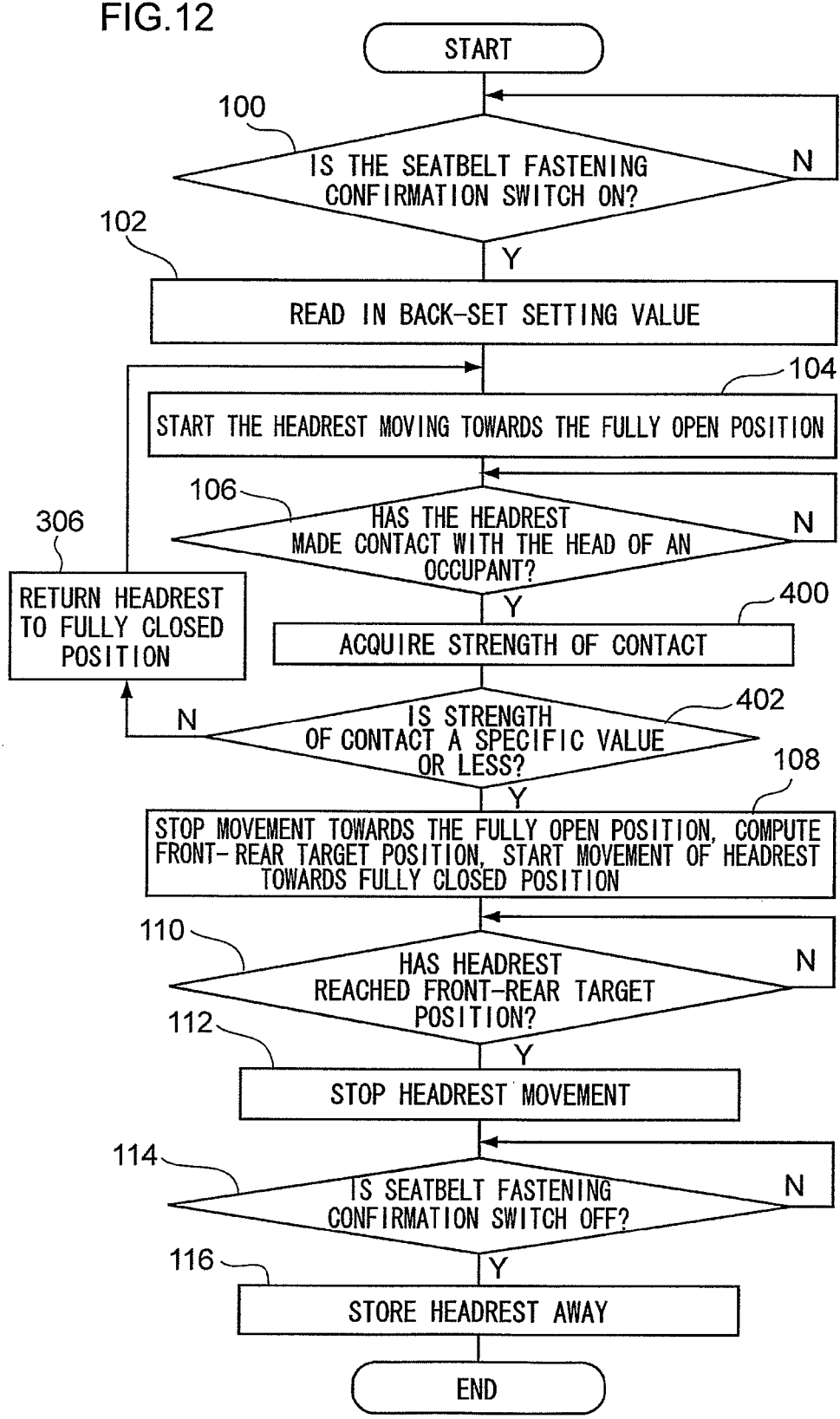

HEADREST APPARATUS, METHOD OF ADJUSTING HEADREST POSITION, VEHICLE SEAT

CROSS-REFERENCE TO RELATED APPLICATION

This application is based on and claims priority under 35 USC 119 from Japanese Patent Application No. 2010-143753 filed on Jun. 24, 2010, the disclosure of which is incorporated by reference herein.

BACKGROUND

1. Technical Field

The present invention relates to a headrest apparatus, a method of adjusting headrest position, and a vehicle seat, and in particular to a headrest apparatus, a method of adjusting headrest position, and a vehicle seat capable of automatically adjusting the position of a headrest to an appropriate state.

2. Related Art

A proposal has been made for a headrest position adjustment apparatus and a headrest position adjustment method in which the electrostatic capacitance between the head of a person seated in a seat and a headrest is measured using a detection electrode disposed spanning the entire height direction region on the front face side of the headrest, and the position of the headrest is then adjusted based on the measurement results (see for example Japanese Patent Application Laid-Open (JP-A) No. 2009-154551).

However, in the technology described in JP-A No. 2009-154551, employing the electrostatic capacitance between the head and the headrest to adjust the position of the headrest results in a high cost, and there is sometimes issues arise with the stability of headrest position adjustment.

SUMMARY

The present invention is made in consideration of the above circumstances and is directed towards a headrest apparatus, a headrest position adjustment method, and a vehicle seat capable of stably adjusting the position of a headrest to an appropriate state with a cost effective configuration.

In order to achieve the above, a first aspect of the present invention provides a headrest apparatus including:

a headrest main body provided at a top edge portion of a seatback against which the back of an occupant seated in a seat rests, with the headrest main body provided so as to be capable of moving in a vehicle front-rear direction;

a detection section provided at a vehicle front side of the headrest main body to detect contact between the head of an occupant seated in the seat and the headrest main body;

a moving section that moves the headrest main body in the vehicle front-rear direction; and a controller that controls the moving section such that the headrest main body is moved forward until contact between the head of an occupant and the headrest main body is detected by the detection section, and, when contact between the head of an occupant and the headrest main body has been detected by the detection section, controls the moving section to move the headrest main body such that there is a specific amount of back-set separation distance in a horizontal direction between the head of an occupant and the headrest main body.

According to the headrest of the present invention, the headrest main body is provided at a top edge portion of a seatback against which the back of an occupant seated in a seat rests with the headrest main body provided so as to be capable of moving in the vehicle front-rear direction. The headrest main body is moved in the vehicle front-rear direction by the moving section. The controller controls the moving section such that the headrest main body is moved forwards until contact between the head of an occupant and the headrest main body is detected by the detection section. Then, when contact between the head of an occupant and the headrest main body has been detected by the detection section, the controller controls the moving section to move the headrest main body such that there is a specific amount of back-set separation distance in the horizontal direction between the head of an occupant and the headrest main body.

By moving the headrest main body such that the back-set is the specific amount after contact between the head of an occupant and the headrest main body is detected, the position of the headrest can be stably adjusted to an appropriate state with a cost effective structure.

A second aspect of the present invention provides the headrest apparatus of the first aspect, wherein:

the headrest main body is also movable in a height direction; and the controller only moves the headrest main body such that the back-set separation distance is the specific amount when the height direction position of the headrest main body is in a predetermined range of appropriate positions.

A third aspect of the present invention provides the headrest apparatus of the first aspect, wherein:

the headrest main body is also movable in a height direction;

the moving section also moves the headrest main body in the height direction;

the detection section is provided spanning the height direction of the headrest main body and detects the height direction contact position between the head of an occupant and the headrest main body; and the controller controls the moving section to move the headrest main body such that the back-set is the specific amount, and moves the headrest main body upwards or downwards by an amount at misalignment between the height direction contact position detected by the detection section and a predetermined height direction specific position for the headrest main body.

The height direction position of the headrest is accordingly also appropriately adjusted, and the restraining ability for the head of an occupant is enhanced.

A fourth aspect of the present invention provides the headrest apparatus of the first aspect, wherein:

the controller controls the moving section such that the headrest main body is moved so that contact between the head of an occupant and the headrest main body is detected by the detection section a plurality of times, and controls the moving section so as to move the headrest main body such that the back-set is the specific amount after movement amounts of the headrest main body from the control start position to points of contact have converged.

A fifth aspect of the present invention provides the headrest apparatus of the third aspect, wherein:

the controller controls the moving section such that the headrest main body is moved so that contact between the head of an occupant and the headrest main body is detected by the detection section a plurality of times, and controls the moving section so as to move the headrest main body such that the back-set separation distance is the specific amount after the detected height direction contact positions have converged.

A sixth aspect of the present invention provides the headrest apparatus of the first aspect, wherein:

the detection section detects a strength of contact between the head of an occupant and the headrest main body; and the controller moves the headrest main body so as to achieve the back-set separation distance of the specific amount when the strength of contact detected by the detection section is a predetermined specific strength or less.

Namely, control is not performed to make the headrest main body move to a back-set by the specific amount, when the strength of contact detected is greater than a predetermined specific strength.

Accordingly, adjusting the headrest to an inappropriate position based on a contact detected position of contact detected between the head of an occupant in an inappropriate position when the posture of the occupant has not stabilized and the headrest can be prevented by detecting contact between the head of an occupant and the headrest main body plural times, and/or by detecting strength of contact. Consequently, more stable headrest position adjustment can be achieved.

A seventh aspect of the present invention provides the headrest apparatus of the first aspect, wherein:

the headrest main body is provided with a headrest rear section supported at the top edge portion of the seatback and a headrest front section that is configured so as to be capable of approaching towards and separating from the headrest rear section, and to be capable of moving in the vehicle front-rear direction between a fully closed position where the headrest front section is closest to the headrest rear section and a fully open position where the headrest front section is furthest away from the headrest rear section;

the detection section is provided at the vehicle front side of the headrest front section; and the moving section moves the headrest main body in the vehicle front-rear direction such that the headrest front section moves between the fully open position and the fully closed position.

An eighth aspect of the present invention provides a method of adjusting headrest position, the method including:

moving a headrest main body forward with a moving section, the headrest main body being provided at a top edge portion of a seatback against which the back of an occupant seated in a seat rests and being provided so as to be capable of moving in a vehicle front-rear direction;

detecting contact between the head of an occupant seated in the seat and the headrest main body with a detection section provided at the vehicle front side of the headrest main body; and moving the headrest main body with a moving section to achieve a specific amount of back-set separation distance in the horizontal direction between the head of an occupant and the headrest main body.

The vehicle seat of the present invention is configured with the above headrest apparatus.

As explained above, the headrest apparatus according to the present invention employs a detection section to detect contact between the head of an occupant and a headrest front section, and moves the headrest front section so as to achieve a back-set of a specific amount between the head of an occupant and the headrest when contact has been detected between the head of an occupant and a headrest front section. An effect is accordingly exhibited of enabling the position of the headrest to be stably adjusted to an appropriate state with a cost effective configuration.

BRIEF DESCRIPTION OF THE DRAWINGS

Exemplary embodiments of the present invention will be described in detail based on the following figures, wherein:

FIG. 12 is a flow chart of contents of a headrest position control processing routine in the fourth exemplary embodiment.

DETAILED DESCRIPTION

Detailed explanation follows regarding exemplary embodiments applied to a vehicle headrest apparatus of the present invention, with reference to the drawings.

First Exemplary Embodiment

Figure 1:
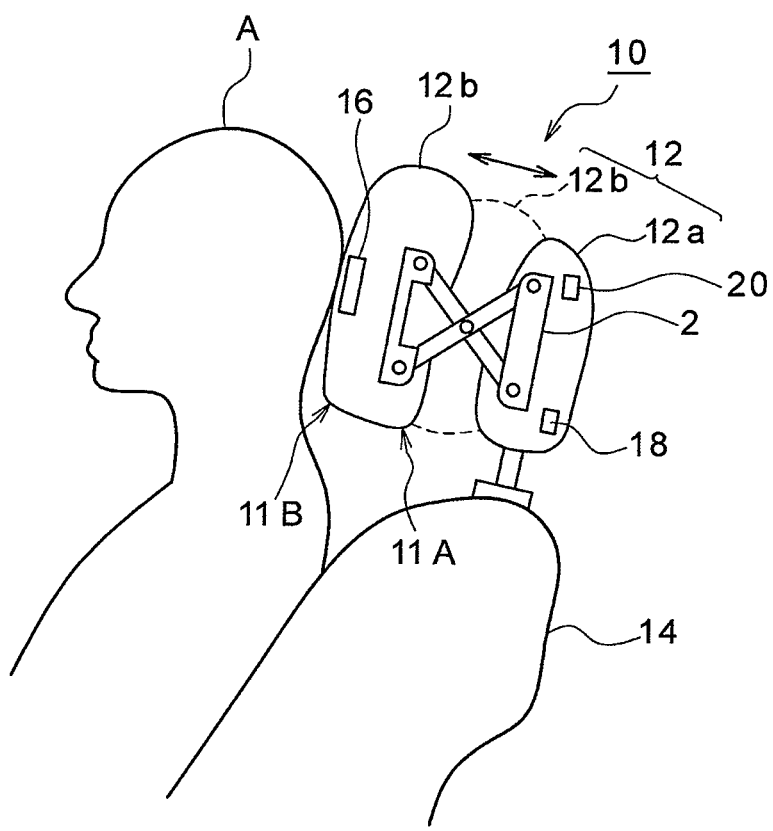
FIG. 1 is a schematic diagram illustrating a headrest apparatus according to a first exemplary embodiment.

As shown in FIG. 1, a headrest apparatus 10 of the first exemplary embodiment includes: a headrest main body 12; a contact detection sensor 16 for detecting contact between the head of an occupant and the headrest; a headrest operation amount detection sensor 18 for detecting a movement amount (operation amount) of a headrest front section 12b; and a headrest control electronic control unit (ECU) 20.

The headrest main body 12 includes: a headrest rear section 12a supported at a top edge portion of a seatback 14 for resting the back of an occupant A against when seated; and the headrest front section 12b that is moveable with respect to the headrest rear section 12a within a specific range from a fully closed position 11A closest to the headrest rear section 12a to a fully open position 11B furthest away from the headrest rear section 12a. In the example of FIG. 1, the headrest front section 12b positioned at fully closed position 11A is shown with broken lines, and the headrest front section 12b positioned at the fully open position 11B is shown with solid lines.

A more precise explanation of the headrest main body 12 now follows. The headrest main body 12 includes the headrest front section 12b disposed at the vehicle front side and the headrest rear section 12a disposed at the vehicle rear side, as described above, and also includes an internal drive mechanism 2 for driving the headrest front section 12b in the front-rear directions. The headrest front section 12b is moved to-and-fro in the vehicle front-rear direction relative to the headrest rear section 12a to control the separation distance between the head of an occupant and the headrest front section 12b by being driven by the drive mechanism 2. More specifically, the back-set (amount of back-set), this being the horizontal separation distance between the head of an occupant and the headrest front section 12b, is controlled.

Figure 2:
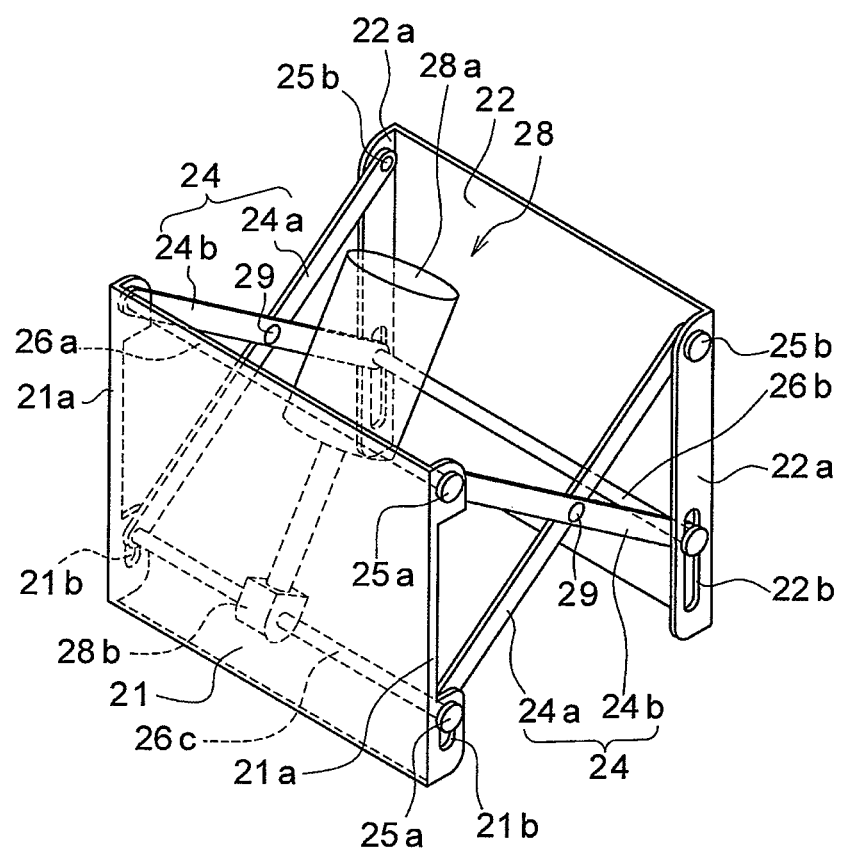
FIG. 2 is a perspective view illustrating a schematic configuration of a drive mechanism according to the first exemplary embodiment.

FIG. 2 shows a configuration diagram of an example of the drive mechanism 2. Left-right pairs of X-shaped links 24 are connected to a front-rear pair of bases 21, 22. The one base 21 at the front face side is connected inside the headrest front section 12b, and the other base 22 at the back face side is connected to the headrest rear section 12a. The pairs of links 24 are each configured by two link members 24a, 24b, with the link members 24a, 24b rotatably connected together by pins 29 at a substantially central portion of the link members 24a, 24b. The two end portions of the link members 24a, 24b are connected to respective side portions 21a, 21b integrally provided at the sides of the two bases 21, 22.

The pair of link members 24a are connected together by a shaft 26c. The two ends of the shaft 26c are slidably connected to vertical elongated guide holes 21b formed in the side portions 21a of the base 21. The rear end portions of the link members 24a are rotatably connected by pins 25b to the side portions 22a of the base 22.

The pair of link members 24b have front end portions connected to each other by a shaft 26a, and rear end portions connected by a shaft 26b. The front end portions of the link members 24b are rotatably connected by pins 25a to the side portions 21a of the base 21, and both end portions of the shaft 26b are slidably connected to vertical guide holes 22b formed in the side portions 22a of the base 22.

A drive unit 28 is provided to the back face side base 22 as the drive source of the drive mechanism 2. A motor 28a of the drive unit 28 is attached at the inside of the base 22. The drive axis of the motor 28a is connected to the shaft 26c through a ball screw section 28b. The function of the ball screw section 28b is to convert forward and reverse rotation of the drive unit 28 into a rise and fall operation of the shaft 26c. The X-shaped pairs of links 24 operate like a pantograph to move the base 21 relative to the base 22 under driving control of the drive unit 28.

The drive mechanism 2 shown in FIG. 2 is merely an example of a mechanism for moving the headrest front section 12b and configuration may be made with any mechanism that moves the headrest front section 12b relative to the headrest rear section 12a.

The contact detection sensor 16 is disposed on the front face side of the headrest front section 12b and outputs a detection signal to the headrest control ECU 20 indicating that contact has been detected when an object makes contact with the contact detection sensor 16. A contact sensor or pressure sensor, for example, may be employed as the contact detection sensor 16.

The headrest operation amount detection sensor 18 is for detecting the movement amount (operation amount) of the headrest front section 12b from the fully closed position 11A, and outputs a detection signal to the headrest control ECU 20 indicating the detected movement amount. A potentiometer, a linear sensor, a rotary encoder, for example, may be employed as the headrest operation amount detection sensor 18. Configuration may be made such that instead of employing a sensor to detect movement amount a sensor is employed to detect the position of the headrest front section 12b from the fully closed position 11A.

Figure 3:
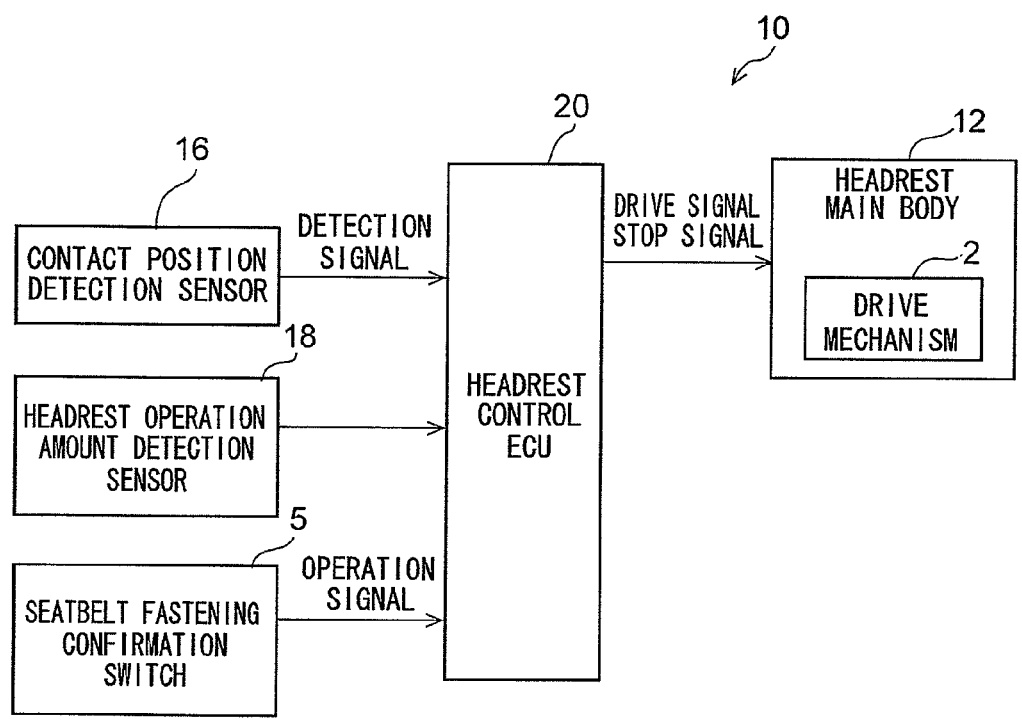
FIG. 3 is block diagram illustrating an electrical system configuration of a headrest apparatus according to the first exemplary embodiment.

As shown in FIG. 3, the contact detection sensor 16, the headrest operation amount detection sensor 18, a seatbelt fastening confirmation switch 5, and the drive mechanism 2 (or more precisely the motor 28a of the drive mechanism 2) are connected to the headrest control ECU 20. The headrest control ECU 20 includes: a Read Only Memory (ROM) as a storage medium (storage section) for storing base programs such as an OS, and for storing a program for executing a headrest position control processing routine, explained in detail below; a Central Processing Unit (CPU) that controls the headrest apparatus 10 overall; a Random Access Memory (RAM) for temporarily storing various data; and an input-output (I/O) port. The ROM, CPU, RAM and I/O port are mutually connected to each other through a bus.

The contact detection sensor 16, the headrest operation amount detection sensor 18, the seatbelt fastening confirmation switch 5, and the motor 28a are connected to the I/O port. The seatbelt fastening confirmation switch 5 outputs a signal indicating ON when the seatbelt is fastened, and outputs a signal indicating OFF when the seatbelt is not yet fastened.

A back-set setting value is stored in the ROM with an appropriate value for back-set between the head of an occupant and the headrest. The smaller the back-set the higher the restraining ability to the head of an occupant such as during a collision from behind, however it can be annoying to an occupant as there is only a small separation distance between the head of an occupant and the headrest. The larger the back-set the more comfortable it is for an occupant, however the restraining ability to the head of an occupant, such as during a collision from behind, is lowered. Accordingly an appropriate value for the back-set setting value is predetermined in consideration of a balance between the restraining ability to the head of an occupant and comfort. The back-set setting value can be, for example, set at 35 mm.

Figure 4:
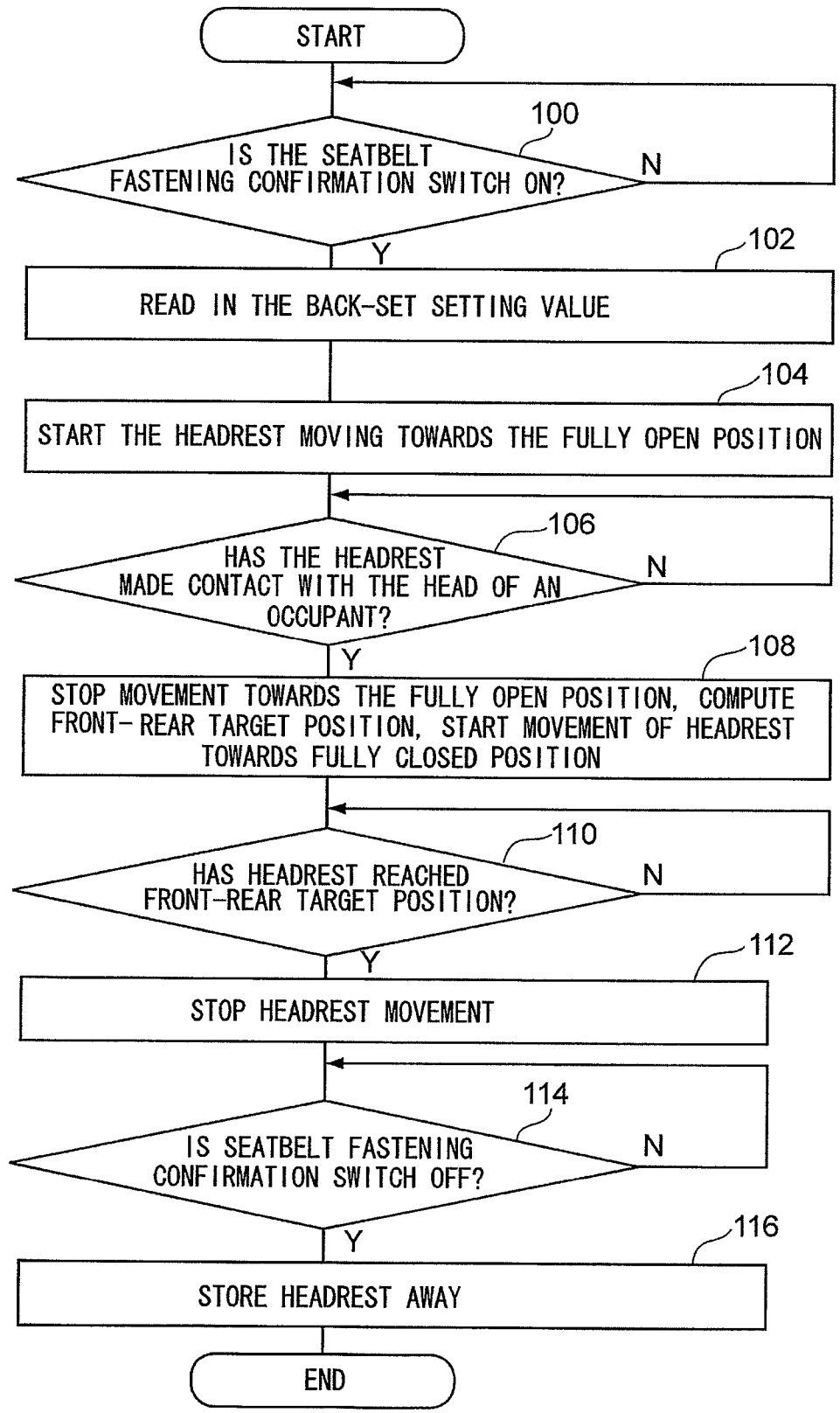
FIG. 4 is a flow chart of the contents of a headrest position control processing routine of the first exemplary embodiment.

Explanation follows regarding a headrest position control processing routine executed by the headrest apparatus 10 of the first exemplary embodiment, with reference to FIG. 4. When power is supplied from a power supply, not shown in the drawings, to the headrest control ECU 20, the CPU of the headrest control ECU 20 starts executing the headrest position control processing routine program that has been read from the ROM. Explanation follows regarding a case in which the position of the headrest front section 12b when the current routine is started (initial position) is the fully closed position 11A.

At step 100 a signal is imported from the seatbelt fastening confirmation switch 5, and determination is made as to whether or not the seatbelt is fastened on the seat where an occupant is sitting by determining whether or not the seatbelt fastening confirmation switch 5 is ON. If the seatbelt fastening confirmation switch 5 has been switched ON, processing proceeds to step 102. Configuration may be made such that processing proceeds to the next step after a specific duration has elapsed from when the seatbelt fastening confirmation switch 5 has been switched ON in order to secure enough time for an occupant to adopt a stable posture after fastening the seatbelt. If the seatbelt fastening confirmation switch 5 is switched OFF, the determination of step 100 continues until it is switched ON.

The back-set setting value stored in the ROM is read at step 102. At the next step 104, the motor 28a is controlled, and the headrest front section 12b is moved towards the fully open position 11B from the fully closed position 11A. Movement of the headrest front section 12b thereby starts in the arrow F direction of FIG. 5.

At the next step 106, the detection signal is imported from the contact detection sensor 16, and determination is made as to whether or not the head of an occupant and the headrest front section 12b have made contact. Processing proceeds to step 108 if contact has been detected between the head of an occupant and the headrest front section 12b, and if no contact was detected the determination of step 106 is performed repeatedly until contact is detected. However, when the headrest front section 12b arrives at the fully open position 11B without detecting contact with the head of an occupant, the headrest front section 12b is first returned to the fully closed position 11A, and then the processing from step 104 is repeated.

Figure 5:
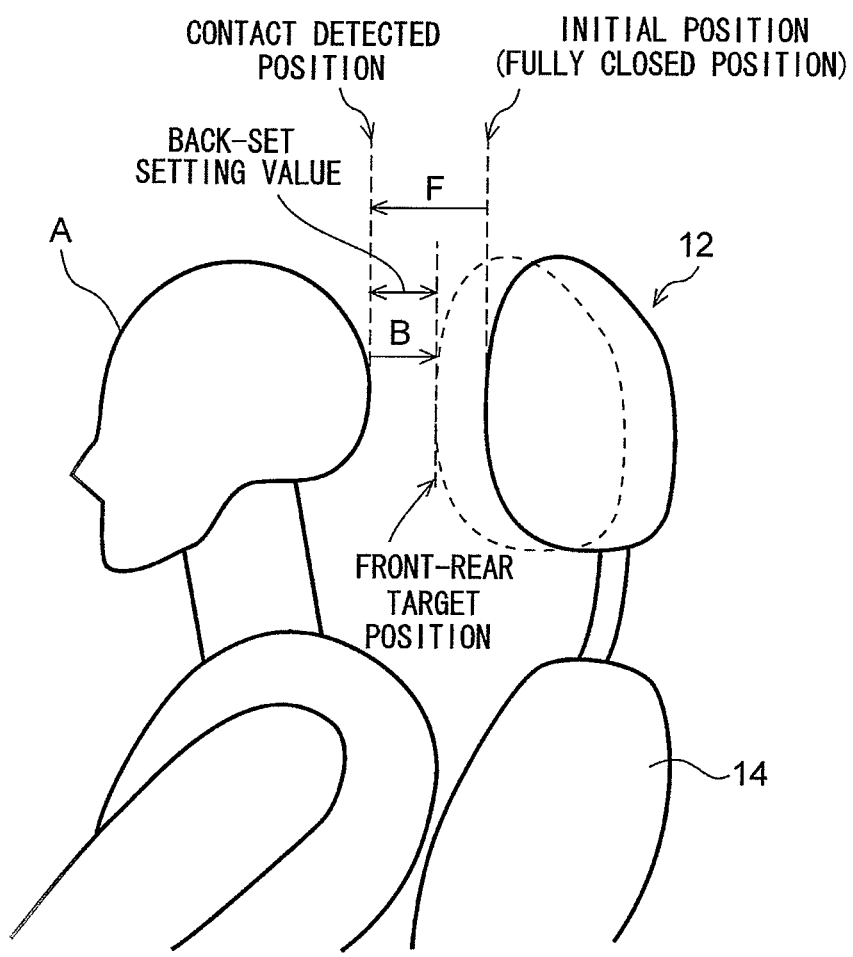
FIG. 5 is an explanatory diagram of adjustment of a headrest to a front-rear target position.

The motor 28a is controlled at step 108, movement of the headrest front section 12b towards the fully open position 11B is stopped, the front-rear target position is computed, and the headrest front section 12b is then moved towards the fully closed position 11A so as to attain the front-rear target position. The headrest front section 12b thereby starts moving in the arrow B direction of FIG. 5. The front-rear target position is schematically shown in FIG. 5 and is the position to move towards the direction of the fully closed position 11A in order to attain a separation of the back-set setting value acquired at step 102 from the contact detected position, where contact with the head of an occupant was detected in step 106. The front-rear target position is, for example, computed by acquiring from the headrest operation amount detection sensor 18 a movement amount to the contact detected position where contact with head of an occupant was detected, and subtracting from the movement amount of the contact detected position a movement amount of the back-set setting value from this movement amount to give the movement amount to the front-rear target position.

Next at step 110 the detection signal is imported from the headrest operation amount detection sensor 18, and determination is made as to whether or not the headrest front section 12b has reached the front-rear target position, based on the movement amount indicated by the imported detection signal. Processing proceeds to step 112 if the headrest front section 12b has reached the front-rear target position. However, if the headrest front section 12b has not yet reached the front-rear target position, the determination of step 110 is performed repeatedly until the front-rear target position is reached.

The motor 28a is controlled at step 112 and the movement of the headrest front section 12b is stopped. By thereby stopping movement of the headrest front section 12b, the appropriate amount of back-set (back-set setting value) is achieved. The broken lines in FIG. 5 show the headrest with the back-set in an adjusted state to the back-set setting value.

At the next step 114, the signal is imported from the seatbelt fastening confirmation switch 5, and determination is made as to whether or not the seatbelt fastening confirmation switch 5 is switched OFF. Processing proceeds to step 116 if the seatbelt fastening confirmation switch 5 is switched OFF, however if the seatbelt fastening confirmation switch 5 is switched ON the determination of step 114 is performed repeatedly until determined to be OFF.

The motor 28a is controlled at step 116 and the headrest front section 12b is moved to the fully closed position 11A, the headrest front section 12b is stored in its initial position and processing is ended.

As explained above, according to the headrest apparatus of the first exemplary embodiment, a contact detection sensor is disposed in the headrest front section, the headrest front section is moved towards the fully open position (forwards). By adjusting the position of the headrest to a position shifted from the position where contact is detected with the head of an occupant towards the fully closed position (backwards) by the amount of the back-set setting value, this being an appropriate value of back-set, a cost efficient configuration is thereby achieved capable of adjusting the headrest position to an appropriate state.

The first exemplary embodiment may be configured such that when the headrest in question is capable of moving in the height direction, the processing of the present exemplary embodiment is only performed when the headrest is at an appropriate height. Specifically, determination may be made as to whether or not the height of the headrest is an appropriate height by providing a sensor to detect whether or not the height of the headrest has been adjusted to outside of a range of appropriate heights. In such a configuration, a step may be provided for determining whether or not the height of the headrest is within the range of appropriate heights prior to performing step 104 of the headrest position control processing routine of FIG. 4, and the processing from step 104 onwards executed when the within the appropriate height range.

Second Exemplary Embodiment

Explanation follows regarding a headrest apparatus 210 of the second exemplary embodiment. Parts of the configuration similar to that of the headrest apparatus 10 of the first exemplary embodiment are allocated the same reference numerals and further explanation thereof is omitted.

Figure 6:
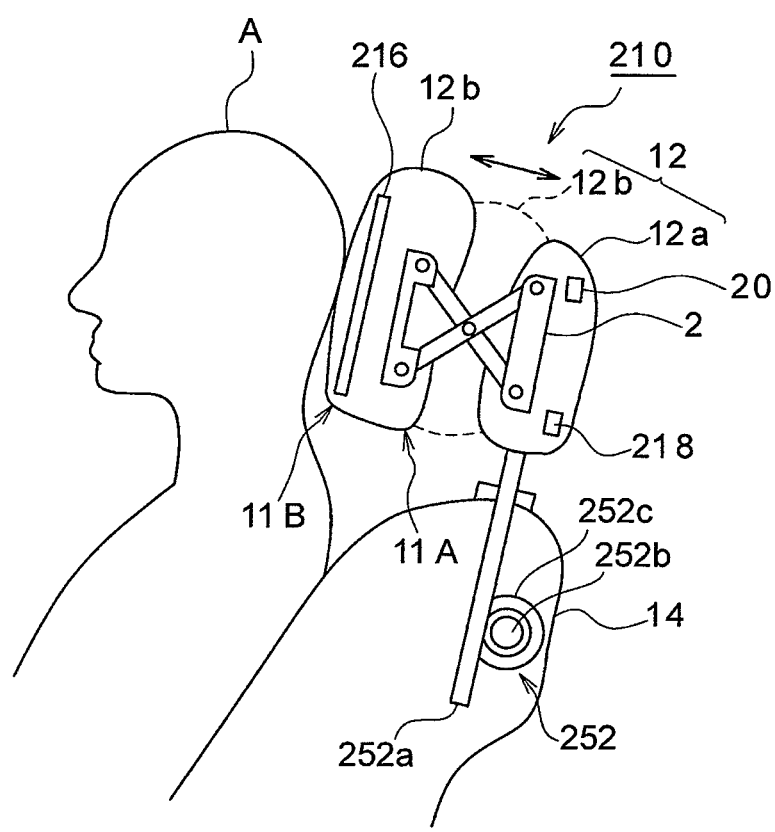
FIG. 6 is a schematic diagram illustrating a headrest apparatus according to a second exemplary embodiment.
Figure 7:
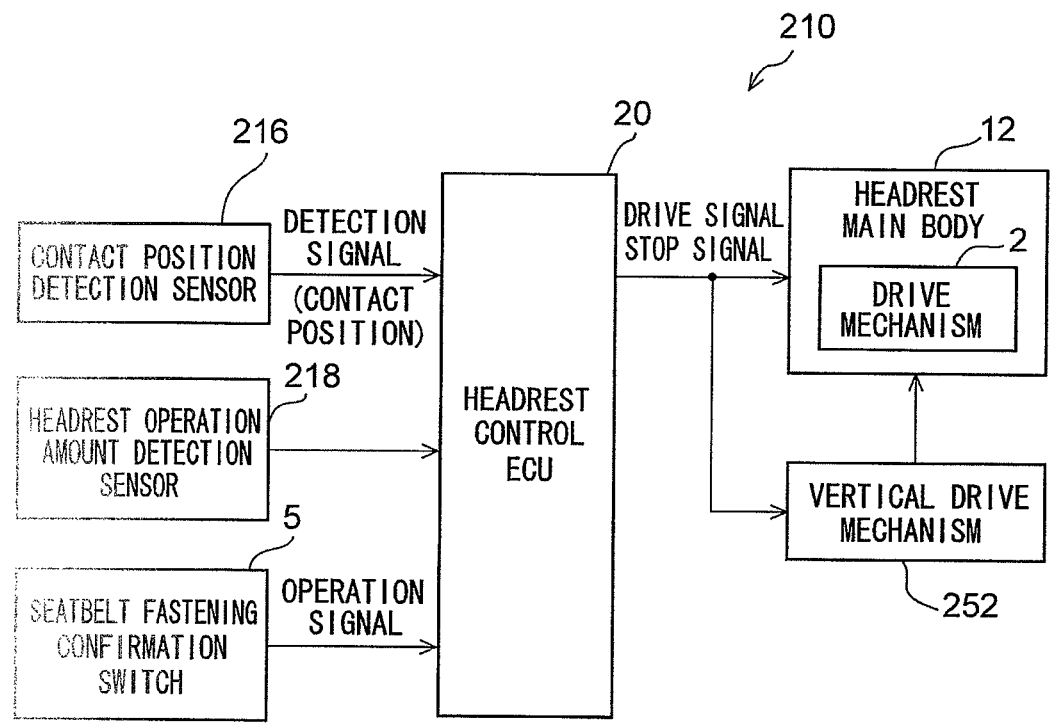
FIG. 7 is a block diagram illustrating an electrical system configuration of a headrest apparatus according to the second exemplary embodiment.

The headrest apparatus 210 of the second exemplary embodiment, as shown in FIG. 6 and FIG. 7, includes: a headrest main body 12; a contact position detection sensor 216 for detecting any contact between the head of an occupant and the headrest, and for detecting the height direction contact position; a headrest operation amount detection sensor 218; a headrest control electronic control unit (ECU) 20; and a vertical drive mechanism 252 for driving the headrest front section 12b in the height direction.

The contact position detection sensor 216 is disposed across the whole of the height direction region at the front face side of the headrest front section 12b, and outputs a detection signal to the headrest control ECU 20 indicating the height direction contact position when an object makes contact with the contact position detection sensor 216. A pressure sensor sheet or a contact sensor array formed from plural contact sensors arrayed along the height direction, for example, may be employed as the contact position detection sensor 216.

The vertical drive mechanism 252 is configured with a support member 252a for supporting the headrest rear section 12a provided inside the seatback 14, and with a motor 252b and an actuator 252c. Forward or rear rotation of the motor 252b is converted into vertical movement of the support member 252a through the actuator 252c. The headrest front section 12b, which is connected to the headrest rear section 12a supported by the support member 252a, is accordingly also capable of movement in the height direction.

The headrest operation amount detection sensor 218 is for detecting the movement amount of the headrest front section 12b from the fully closed position 11A, and for detecting the movement amount of the headrest front section 12b from a specific reference position in the height direction. The headrest operation amount detection sensor 218 outputs a detection signal indicating the detected movement amount to the headrest control ECU 20. A potentiometer, linear sensor, or rotary encoder, for example, may be employed as the headrest operation amount detection sensor 218. Configuration may be made with a sensor to detect the position of the headrest front section 12b from a specific reference position instead of employing a sensor for detecting the movement amount.

A back-set setting value and a height direction setting position that is an appropriate height direction contact position between the head of an occupant and the headrest front section 12b are both stored in the ROM. The height direction setting position is a predetermined position in the height direction for contact with the head of an occupant by moving the headrest front section 12b forwards when the headrest height is at an appropriate height in consideration of a balance between the restraining ability to the head of an occupant and comfort.

Figure 8:
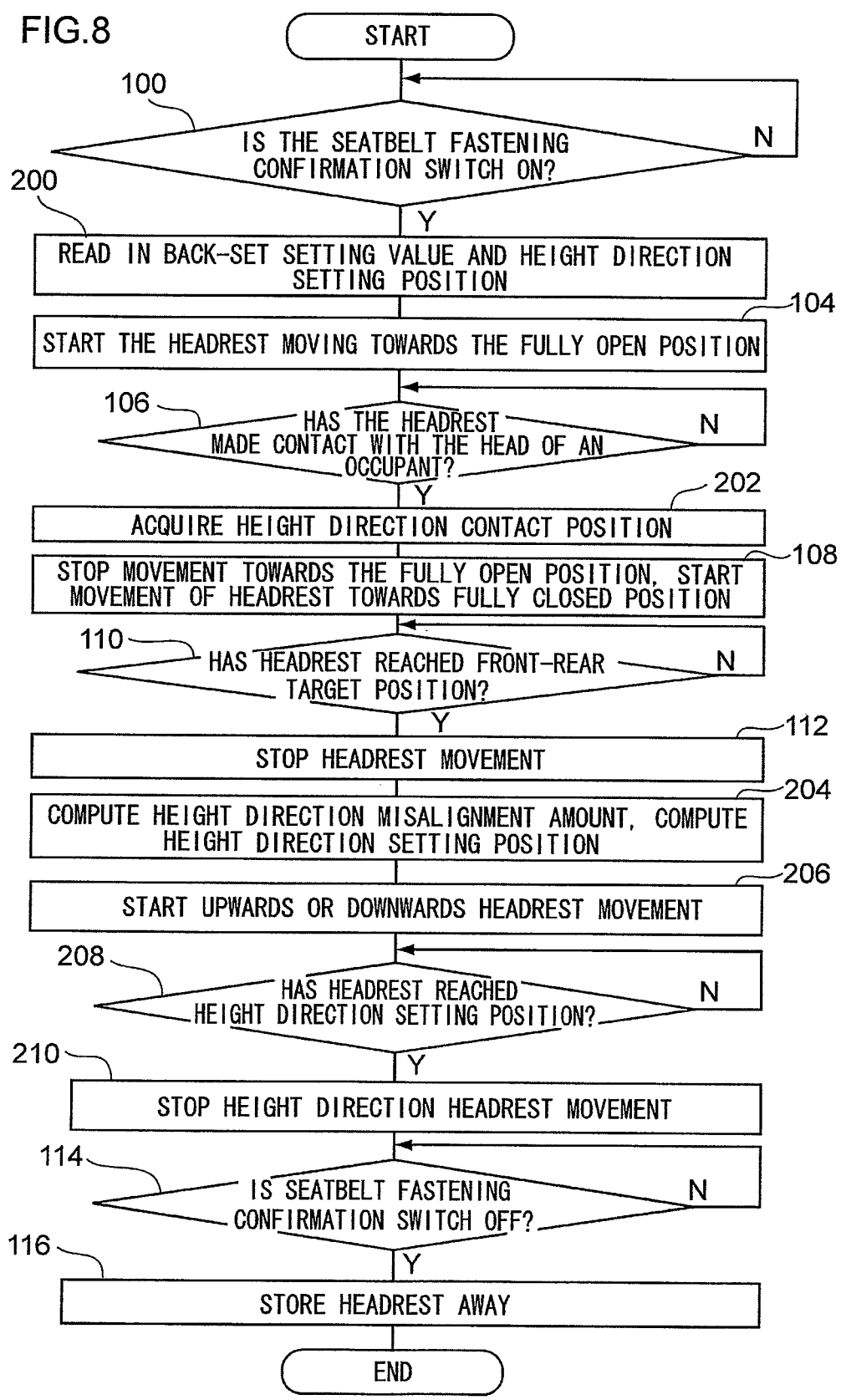
FIG. 8 is a flow chart of the contents of a headrest position control processing routine of the second exemplary embodiment.

Explanation follows regarding a headrest position control processing routine in the headrest apparatus 210 of the second exemplary embodiment, with reference to FIG. 8. The current routine is started when power is supplied from a power supply, not shown in the drawings, to the headrest control ECU 20, the CPU of the headrest control ECU 20 starts executing the headrest position control processing routine program that has been read from the ROM. Explanation follows regarding a case in which the position of the headrest front section 12b when the current routine is started (initial position) is the fully closed position 11A and the height direction position is the specific reference position. Portions of the headrest position control processing routine similar to those of the first exemplary embodiment are allocated the same reference numbers and further explanation thereof is omitted.

At step 100 determination is made as to whether or not the seatbelt is fastened on the seat where an occupant is sitting by determining whether or not the seatbelt fastening confirmation switch 5 is ON, and then processing proceeds to step 200 where the back-set setting value and the height direction setting position stored on the ROM are read in. Then, when contact with the head of an occupant is detected during the next steps 104 and 106, processing proceeds to step 202, where the height direction contact position of the headrest front section 12b is acquired based on a detection signal from the contact position detection sensor 216.

Then, through steps 108 to 112, the headrest front section 12b is moved to the front-rear target position so as to set the amount of the back-set to the back-set setting value.

At the next step 204, the amount of misalignment in the height direction is computed based on the height direction setting position read in at step 200 and the height direction contact position acquired at step 202, and the height target position then computed. The height target position is a position shifted upwards or downwards from the current height direction position (this being the specific reference position in this case) by the height direction misalignment amount computed in step 204. More specifically, for example, as shown schematically in FIG. 9, the height direction misalignment amount is the difference between the height direction setting position and the height direction contact position, and is a value computed so as to have a plus sign when the contact position is above with respect to the height direction setting position, and minus sign when the contact position is below. The height target position can be computed as a position achieved by movement upwards by the misalignment amount when the misalignment amount is plus, and is a position achieved by movement downwards by the misalignment amount when the misalignment amount is minus.

The motor 252b is controlled at the next step 206, and the support member 252a supporting the headrest rear section 12a is moved upwards or downwards according to the height target position computed at step 204. The headrest rear section 12a, supported by the support member 252a, accordingly starts moving either in the arrow U direction or in the arrow D direction shown in FIG. 9.

At the next step 208, the detection signal is imported from the headrest operation amount detection sensor 218, and determination is made as to whether or not the headrest front section 12b has reached the height target position based on the movement amount indicated in the imported detection signal.

Processing proceeds to step 210 if the headrest front section 12b has reached the height target position, however if the height target position has not been reached the determination of step 208 is performed repeatedly until the height target position is reached.

Figure 9:
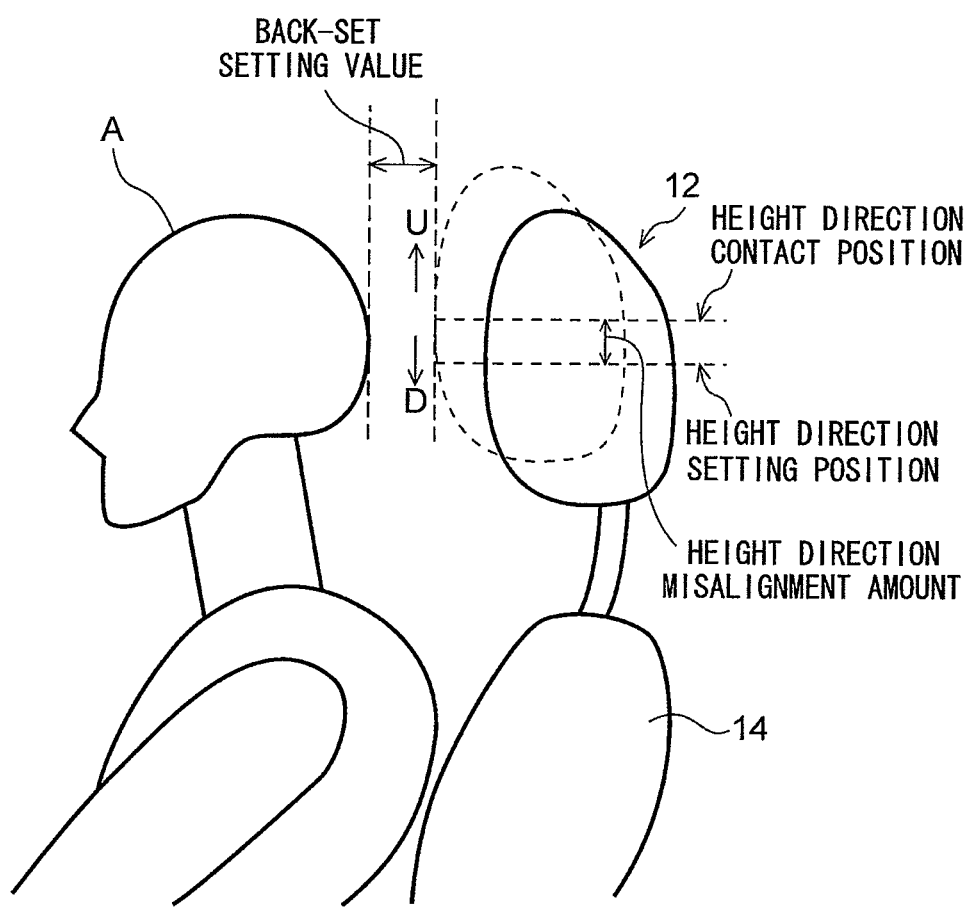
FIG. 9 is an explanatory diagram of adjustment of a headrest to a height target position.

The motor 252b is controlled at step 210, and upwards or downwards moving of the headrest front section 12b is stopped. Movement of the headrest front section 12b is thereby stopped, and the headrest front section 12b is set in an appropriate position in the height direction. The broken lines in FIG. 9 illustrates the headrest state when the back-set is adjusted to the back-set setting value, and the height direction position has been adjusted by the misalignment amount based on the height direction setting position.

As explained above, according to the headrest apparatus of the second exemplary embodiment, a contact position detection sensor is disposed spanning the height direction at the headrest front section, the height direction contact position between the head of an occupant and the headrest front section is detected. The headrest front section is then moved such that the amount of the back-set becomes the back-set setting value, an appropriate value for back-set, and the headrest front section is moved upwards or downwards to achieve an appropriate height direction positional relationship between the head of an occupant and the headrest. A cost effective configuration capable of stably adjusting the headrest position to an appropriate state is thereby achieved.

While explanation has been given of a case in the second exemplary embodiment in which the headrest front section that is connected to the headrest rear section is moved up or down by moving a support member supporting the headrest rear section up or down, configuration may be made so as to move the headrest front section relative to the headrest rear section.

Third Exemplary Embodiment

Explanation follows regarding a third exemplary embodiment. The third exemplary embodiment raises stability further by detecting contact between the head of an occupant and the headrest plural times. The configuration of the headrest apparatus of the third exemplary embodiment is similar to that of the headrest apparatus of the first exemplary embodiment and so further explanation thereof is omitted.

Figure 10:
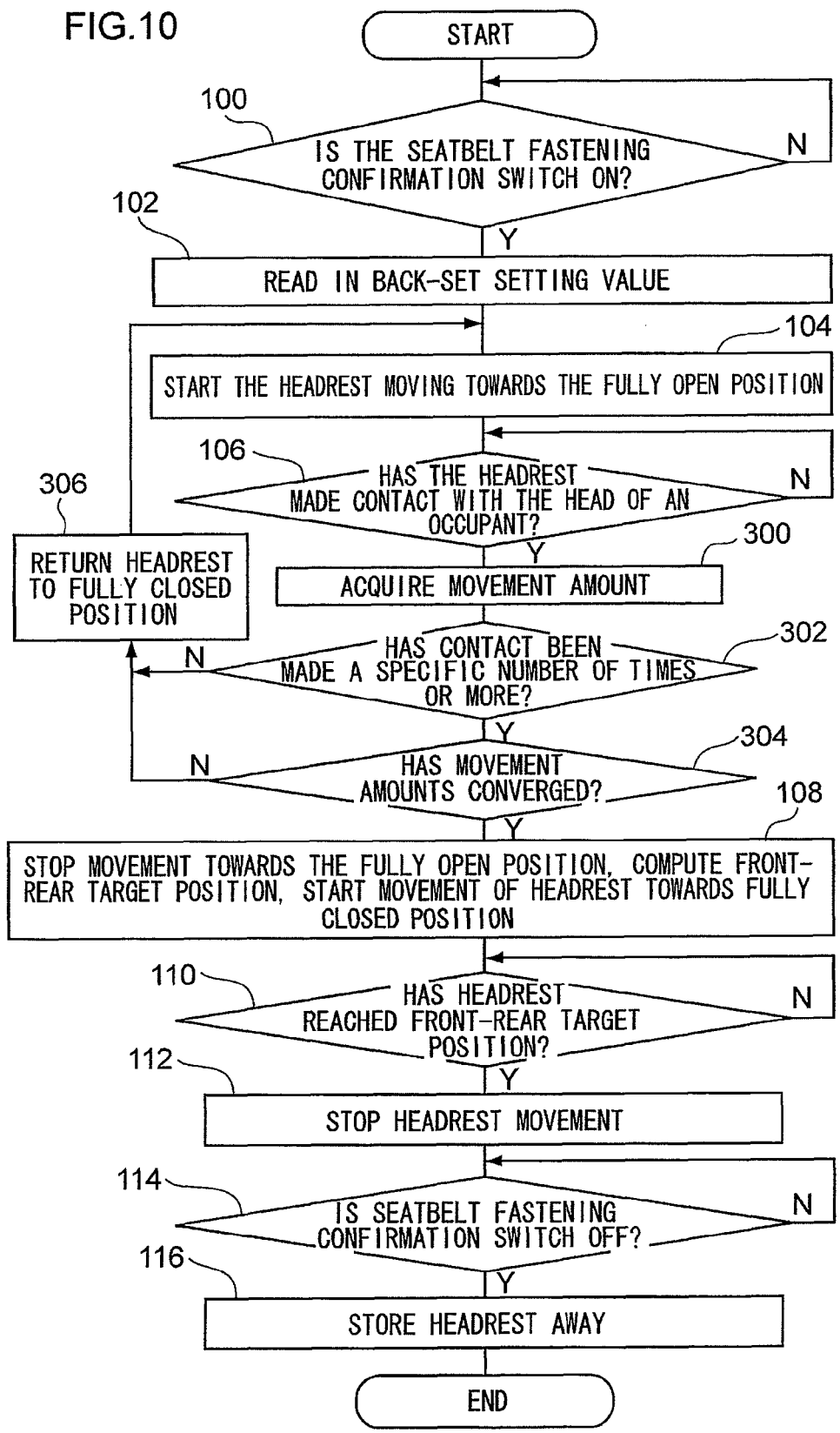
FIG. 10 is flow chart of contents of a headrest position control processing routine in a third exemplary embodiment.

Explanation follows regarding a headrest position control processing routine executed by a headrest apparatus of the third exemplary embodiment, with reference to FIG. 10. In the current routine, when power is supplied from a power supply, not shown in the drawings, to the headrest control ECU 20, the CPU of the headrest control ECU 20 starts executing the headrest position control processing routine program that has been read from the ROM. Explanation follows regarding a case in which the position of the headrest front section 12b when the current routine is started (initial position) is the fully closed position 11A. Processing in the headrest position control processing routine similar to the first exemplary embodiment is allocated the same reference number and further explanation thereof is omitted.

Through execution of steps 100 to 106, contact between the head of an occupant and the headrest front section 12b is detected, then at step 300 a detection signal is imported from the headrest operation amount detection sensor 18, and the movement amount is acquired from the initial position to the contact detected position where contact is detected at step 106.

At the next step 302, determination is made as to whether or not detection of contact between the head of an occupant and the headrest front section 12b has already been made a specific number of times or greater. The specific number of times can be set, for example, at 3 times. Processing proceeds to step 304 if detection has already been made the specific number of times or greater, however if detection has not yet been made the specific number of times then processing proceeds to step 306.

At step 304 determination is made as to whether or not there is convergence in the movement amounts of the headrest front section 12b acquired at step 300 every time contact with the head of an occupant was detected. Determination as to whether or not there has been convergence can be performed, for example, by determining whether or not variance of the movement amounts from each of detections is a specific threshold value or less. Processing proceeds to step 306 if the movement amounts are not convergent.

The motor 28a is controlled at step 306, the headrest front section 12b is returned to the fully closed position 11A, and processing then returns to step 104. Note that while explanation is given of a case in which the headrest front section 12b is returned to the fully closed position 11A, there is no need to completely return the headrest front section 12b to the fully closed position 11A, and configuration may be made to move from the contact detected position by a specific movement amount towards the fully closed position 11A.

If determination at step 302 and step 304 is that the movement amounts of the specific number of times of contact detection have not converged then the processing from step 108 onwards is executed.

As explained above, according to the headrest apparatus of the third exemplary embodiment, contact between the head of an occupant and the headrest front section is detected plural times, and the position of the headrest is adjusted after the movement amounts have converged. Accordingly adjusting the headrest to an inappropriate position based on a contact detected position of contact detected between the head of an occupant in an inappropriate position, adopted before the occupant has not settled posture after seatbelt fastening, can be prevented, and more stable headrest position adjustment can be achieved.

Explanation of the third exemplary embodiment is of a case of the first exemplary embodiment where contact detection is made plural times, however application may also be similarly made to the second exemplary embodiment.

When application is made to the second exemplary embodiment, then in place of determination as to whether or not the movement amount has converged, determination may be made as to whether or not the height direction contact position acquired at every contact detection has converged.

Fourth Exemplary Embodiment

Explanation follows regarding the fourth exemplary embodiment. Parts of the configuration similar to those of the headrest apparatus 10 of the first exemplary embodiment are allocated the same reference numbers and further explanation thereof is omitted.

Figure 11:
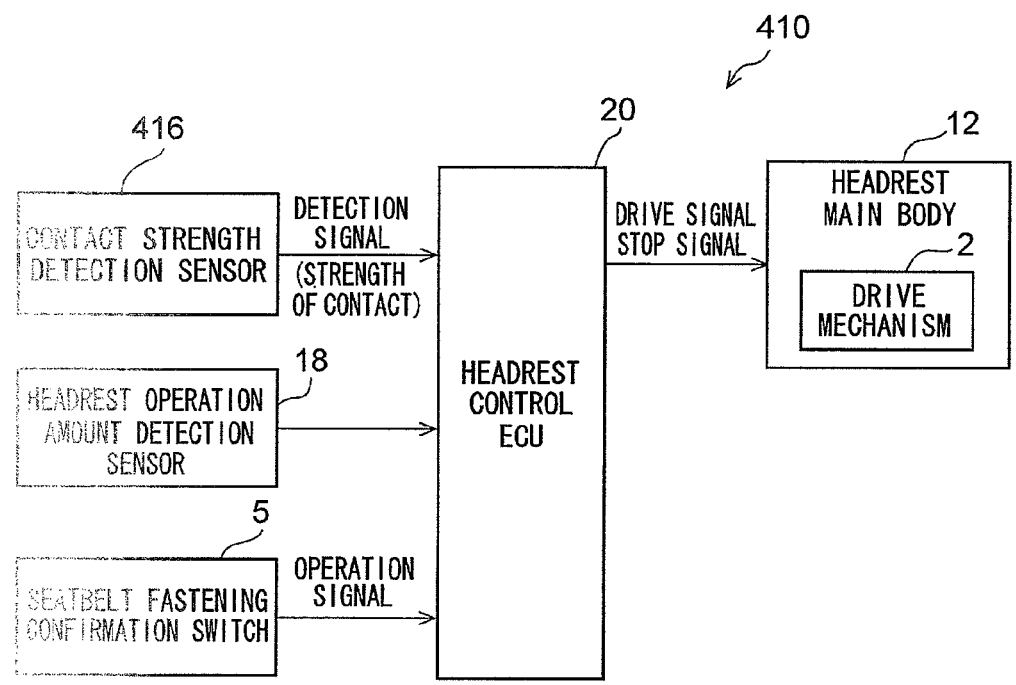
FIG. 11 is a flow chart illustrating an electrical system configuration of a headrest apparatus according to a fourth exemplary embodiment.

The headrest apparatus 410 of the fourth exemplary embodiment, as shown in FIG. 11, includes: a headrest main body 12; a contact strength detection sensor 416 for detecting whether there has been contact between the head of an occupant and the headrest, and for detecting the strength of contact; a headrest operation amount detection sensor 18; and a headrest control ECU 20.

The contact strength detection sensor 416 is disposed on the front face side of the headrest front section 12b and when an object makes contact with the contact strength detection sensor 416, the contact strength detection sensor 416 outputs to the headrest control ECU 20 a detection signal of level dependent on the strength of contact. An acceleration sensor or shock sensor, for example, may be employed as the contact strength detection sensor 416.

Explanation follows regarding a headrest position control processing routine executed by the headrest apparatus of the fourth exemplary embodiment, with reference to FIG. 12. The current routine is started when power is supplied from a power supply, not shown in the drawings, to the headrest control ECU 20, and the CPU of the headrest control ECU 20 starts executing the headrest position control processing routine program that has been read out from the ROM. Explanation follows regarding a case in which the position of the headrest front section 12b when the current routine is started (initial position) is the fully closed position 11A. Processing that is similar to that of the headrest position control processing in the first and the third exemplary embodiments is allocated the same reference number and further explanation thereof is omitted.

When contact with the head of an occupant is detected through execution of steps 100 to 106, then the strength of contact is acquired at step 400 based on the detection signal of the contact strength detection sensor 416.

At the next step 402, determination is made as to whether or not the strength of contact acquired at step 400 is a specific value or greater. The specific value can be predetermined as a strength of contact detected by the contact strength detection sensor 416 when the headrest front section 12b is moved a specific velocity and makes contact with a stationary head of an occupant. If the strength of contact exceeds a specific value then determination can be made that the head of an occupant was in a moving state when contact was made with the headrest front section 12b. If the strength of contact exceeds the specific value, processing proceeds through step 306 to then return to step 104, and if determination is made at step 402 that the strength of contact is the specific value or less then processing from step 108 onwards is executed.

As explained above, according to the headrest apparatus of the fourth exemplary embodiment, the headrest position is adjusted when the strength of contact between the head of an occupant and the headrest front section is the specific value of less. Accordingly, adjustment of the headrest to an inappropriate position based on a contact detected position detected of contact when the head of an occupant was in an inappropriate position while the occupant had not settled posture after fastening their seatbelt can be prevented, and more stable headrest position adjustment can be achieved.

Note that in the fourth exemplary embodiment explanation is given of a case in which detection of strength of contact is applied to the first exemplary embodiment. However similar application may be made to the second exemplary embodiment.

Furthermore, while explanation has been given with an example of 35 mm for an appropriate back-set amount (back-set setting value), an appropriate amount of back-set is not limited to this amount. For example, various values, such as 32 mm and 37 mm, are also possible.

Furthermore, while in each of the exemplary embodiments, explanation is given of cases of adjusting to a back-set setting value of back-set in which the headrest front section is moved rearward from the position where contact is detected between the head of an occupant and the headrest front section, there is no limitation thereto. For example, configuration may be made such that the movement amount of the position where contact is detected is stored when contact is detected, and then the headrest front section is moved to the back-set setting value after first returning it to the fully closed position, namely is moved so that the headrest front section reaches the front-rear target position.

While explanation is given of cases in each of the exemplary embodiments where processing to control the position of the headrest is performed when the seatbelt fastening confirmation switch is switched ON, there is no limitation thereto. Configuration may be made in which the timing of starting control processing is determined by a detection signal of a seating sensor, or by determination of whether or not the vehicle speed is a specific velocity or greater.

In each of the exemplary embodiments, explanation is of a case in which the headrest main body is configured by the headrest front section and the headrest rear section, and the headrest front section is moved. However, application may be made to a configuration like that of the headrest described in JP-A No. 2008-94385, as shown schematically in FIG. 5 and FIG. 9, where the headrest main body itself is moved in the front-rear direction.

What is claimed is:

1. A headrest apparatus comprising:
    a headrest main body provided at a top edge portion of a seatback against which the back of an occupant seated in a seat rests, with the headrest main body provided so as to be capable of moving in a vehicle front-rear direction;
    a detection section provided at a vehicle front side of the headrest main body to detect contact between the head of an occupant seated in the seat and the headrest main body;
    a moving section that moves the headrest main body in the vehicle front-rear direction; and
    a controller that controls the moving section such that the headrest main body is moved forward until contact between the head of an occupant and the headrest main body is detected by the detection section, and, when contact between the head of an occupant and the headrest main body has been detected by the detection section, controls the moving section to move the headrest main body to a target position, wherein a movement amount of the headrest main body from an initial position thereof to the target position is given by subtracting a predetermined back-set setting value from a movement amount of the headrest main body from the initial position to a position where the headrest main body has contacted the head of the occupant.

2. The headrest apparatus of claim 1, wherein:
    the headrest main body is also movable in a height direction; and
    the controller only moves the headrest main body to the target position when the height direction position of the headrest main body is in a predetermined range of appropriate positions.

3. The headrest apparatus of claim 1, wherein:
    the headrest main body is also movable in a height direction;
    the moving section also moves the headrest main body in the height direction;
    the detection section is provided spanning the height direction of the headrest main body and detects the height direction contact position between the head of an occupant and the headrest main body; and
    the controller controls the moving section to move the headrest main body to the target position, and moves the headrest main body upwards or downwards by an amount at misalignment between the height direction contact position detected by the detection section and a predetermined height direction specific position for the headrest main body.

4. The headrest apparatus of claim 1, wherein:
    the controller controls the moving section such that the headrest main body is moved so that contact between the head of an occupant and the headrest main body is detected by the detection section a plurality of times, and controls the moving section so as to move the headrest main body to the target position after movement amounts of the headrest main body from the control start position to points of contact have converged.

5. The headrest apparatus of claim 3, wherein:
    the controller controls the moving section such that the headrest main body is moved so that contact between the head of an occupant and the headrest main body is detected by the detection section a plurality of times, and controls the moving section so as to move the headrest main body to the target position after the detected height direction contact positions have converged.

6. The headrest apparatus of claim 1, wherein:
    the detection section detects a strength of contact between the head of an occupant and the headrest main body; and
    the controller moves the headrest main body to the target position when the strength of contact detected by the detection section is a predetermined specific strength or less.

7. The headrest apparatus of claim 1, wherein:
    the headrest main body is provided with a headrest rear section supported at the top edge portion of the seatback and a headrest front section that is configured so as to be capable of approaching towards and separating from the headrest rear section, and to be capable of moving in the vehicle front-rear direction between a fully closed position where the headrest front section is closest to the headrest rear section and a fully open position where the headrest front section is furthest away from the headrest rear section;
    the detection section is provided at the vehicle front side of the headrest front section; and
    the moving section moves the headrest main body in the vehicle front-rear direction such that the headrest front section moves between the fully open position and the fully closed position.

8. A method of adjusting headrest position, the method comprising:
    moving a headrest main body forward with a moving section, the headrest main body being provided at a top edge portion of a seatback against which the back of an occupant seated in a seat rests and being provided so as to be capable of moving in a vehicle front-rear direction;
    detecting contact between the head of an occupant seated in the seat and the headrest main body with a detection section provided at the vehicle front side of the headrest main body; and
    moving the headrest main body with a moving section to a target position, wherein a movement amount of the headrest main body from an initial position thereof to the target position is given by subtracting a predetermined back-set setting value from a movement amount of the headrest main body from the initial position to a position where the headrest main body has contacted the head of the occupant.

9. A vehicle seat provided with the headrest apparatus of claim 1.

10. A headrest apparatus comprising:
a headrest main body provided at a top edge portion of a seatback which is configured to accommodate the back of an occupant seated in a seat;
a contact detection unit provided at a vehicle front side of the headrest main body configured to detect a contact between the head of the occupant seated in the seat and the headrest main body;
a driving mechanism configured to move the headrest main body to-and-fro in substantially vehicle front-rear directions; and
a headrest control unit configured to control movement of the headrest main body,
wherein the headrest control unit is configured to move the headrest main body toward the front in the vehicle front-rear direction until a contact between the head of the occupant and the headrest main body is detected by the contact detection unit and to move the headrest main body toward the rear in the vehicle front rear direction to a target position, wherein a movement amount of the headrest main body from an initial position thereof to the target position is given by subtracting a predetermined back-set setting value from a movement amount of the headrest main body from the initial position to a position where the headrest main body has contacted the head of the occupant.

11. The headrest apparatus of claim 1, wherein:
the headrest main body is further configured to move in a height direction; and
the headrest control unit is further configured to move the headrest main body only when the height direction position of the headrest main body is in a predetermined range of positions.

12. The headrest apparatus of claim 1, wherein:
the headrest apparatus further comprises a vertical drive mechanism to move the headrest main body to-and-fro substantially in vertical direction when said seatback is substantially in up-right position;
the contact detection unit is further configured to detect the height direction contact position between the head of the occupant and the headrest main body; and
the headrest control unit is further configured to move the headrest main body upwards or downwards to compensate misalignment between the height direction contact position detected by the detection section and a predetermined height direction specific position for the headrest main body.

13. The headrest apparatus of claim 1, wherein the headrest control unit is configured to move the headrest main body from an initial position toward the front in the vehicle front-rear direction until a contact between the head of the occupant and the headrest main body is detected by the contact detection unit a plurality of times, and
to move the headrest main body toward the rear in the vehicle front rear direction the specific amount from the contact position when a variance among each movement amount of the headrest main body is within a specific value.

14. The headrest apparatus of claim 3, wherein the headrest control unit is configured to move the headrest main body from an initial position toward the front in the vehicle front-rear direction until a contact between the head of the occupant and the headrest main body is detected by the contact detection unit a plurality of times, and
to move the headrest main body toward the rear in the vehicle front rear direction a specific amount from the contact position when a variance among each movement amount of the headrest main body is within a specific value.

15. The headrest apparatus of claim 1, wherein the contact detection unit is configured to detects a strength of contact between the head of the occupant and the headrest main body; and
the headrest control unit is configured to move the headrest main body when the strength of contact detected by the contact detection unit is a predetermined specific strength or less.

16. The headrest apparatus of claim 1, wherein:
the headrest main body comprises a rear section and a front section,
the contact detection unit is provided at the vehicle front side of the headrest front section, and
the driving mechanism is configured to move the front section to-and-fro so that the front section moves between a fully closed position where the headrest front section is closest to the headrest rear section and a fully open position where the headrest front section is furthest away from the headrest rear section.

\* \* \* \* \*